H. ORFORD.
MANUFACTURE OF LENSES FOR SPECTACLES OR EYEGLASSES.
APPLICATION FILED JAN. 30, 1909.
943,449.  Patented Dec. 14, 1909.
FIG. I.
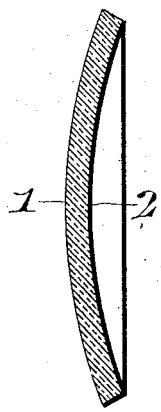
FIG. II.
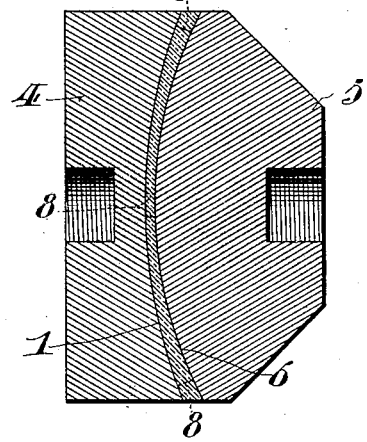
Fig. IV.
FIG. III.
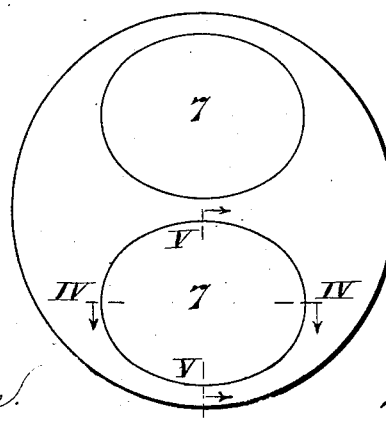
Fig. V.
WITNESSES:
John C. Bergner
James H. Bell
INVENTOR:
Henry Orford,
by his attorneys

UNITED STATES PATENT OFFICE.

HENRY ORFORD, OF PHILADELPHIA, PENNSYLVANIA, ASSIGNOR OF ONE-HALF TO SAMUEL J. TAYLOR, OF PHILADELPHIA, PENNSYLVANIA.

MANUFACTURE OF LENSES FOR SPECTACLES OR EYEGLASSES.

943,449.  Specification of Letters Patent.  Patented Dec. 14, 1909.

Application filed January 30, 1909. Serial No. 475,111.

*To all whom it may concern:*

Be it known that I, HENRY ORFORD, of Philadelphia, in the county of Philadelphia and State of Pennsylvania, have invented certain new and useful Improvements in the Manufacture of Lenses for Spectacles or Eyeglasses, whereof the following is a specification, reference being had to the accompanying drawings.

It is the object of my invention to produce what may be called a multi-focal lens, that is to say, a lens the focal length of which varies gradually as the line of vision passes through the upper or the lower part thereof. Heretofore "bi-focal" lenses have been produced in which different portions of the lenses have been ground to different curvature, but with a sharp line of demarcation between the two, which obscures the vision. My invention differs from such lenses in that the variation of curvature is continuous from the top to the bottom of the lens, so that as the line of vision is lowered, the power of the lens gradually increases. This I accomplish by grinding the convex surface of the lens spherically, while the concave surface is given a parabolic curvature. The same principle may be applied to cylindrical lenses, and although I will describe my invention as applicable to spherically ground glasses, it is to be understood that the same principle applies to cylinders.

In the accompanying drawings, Figure I represents in vertical section a concavo-convex disk, from which I make my lens. Fig. II shows in similar section the dies employed for shaping this disk, so as to impart a parabolic curvature to its concave surface. Fig. III is a plan view of the disk when thus shaped, showing the portions thereof used in the manufacture from it of two corresponding eye glass lenses. Fig. IV is a horizontal central section through a lens embodying my invention. Fig. V is a vertical central section through a lens embodying my invention.

It will be understood that the curvatures and proportions of the drawings are magnified in order to render visible to the eye curvatures which in practice may be very slight. In the manufacture of my lens, I first produce by the ordinary method of grinding a concavo-convex disk as illustrated in Fig. I, the convex surface 1, being ground to the proper spherical curvature and the concave surface 2, being similarly ground to a spherical curvature. My invention as above stated depends upon the imparting to this concave surface of a parabolic curvature. But in practice it is exceedingly difficult, if not impossible, to grind such a curve. I therefore, resort to the following means:—I prepare two metallic dies 4, and 5, (Fig. II), one of which, 4, is provided with a spherical surface corresponding substantially with the convex surface 1, of the disk, while the other die, 5, is provided with a convex parabolic surface 6, differing from the spherical concave surface of the lens. After the disk shown in Fig. I, has been properly ground, it is heated to the point where its surfaces have become slightly plastic and capable of receiving under pressure the impression of a mold, without, however, flowing to such an extent as to create bubbles or flaws in the glass. While in this plastic condition, it is placed between the dies and sufficient pressure exerted to cause the disk to assume the curvatures illustrated in Fig. II. The parabolic surface 6, imparts to the concave surface of the disk a corresponding curvature so that the focal length of the disk is greatest at the center and diminishes gradually as the line of vision approaches the edge. To produce from the disk thus obtained the required spectacle lens there are cut from it two lenses as illustrated in Fig. III, where 7, 7, represent the two eye glass lenses in their relation to the entire disk. The dotted lines 8, 8, in Fig. II, also represent the edges along which the cutting or grinding occurs in the production of the lens. The finished lens thus produced and which in cross section is illustrated by the section between the lines 8, 8, in Fig. II, is possessed of spherical curvature upon one side and parabolic curvature upon the other side, which imparts to the lens a varying focal length as the line of vision passes from the thinner edge at the top to the thicker edge at the bottom. By employing lenses of this character in spectacles or eyeglasses, all the advantages of the so-called bi-focal lenses are secured with important additional advantages. In looking at objects far away, the eye usually employs the upper portion of the lens of an eye glass, and for this a long focal length is provided. In reading, the eye usually drops and employs the lower portion of the lens, and for this a smaller focal length is provided, but instead of a sharp line of demarcation between the two, the variation in curvature is gradually and wholly imperceptible to the eye, rendering the lens more serviceable and less noticeable upon the wearer.

I do not limit myself to the precise construction of lens which I have described as variations therefrom will suggest themselves to those skilled in this art. The curves which I have described may vary, and also the method of imparting them to the lens, and as explained, the principle of construction which I have described is applicable equally to cylindrical as to spherical lenses.

Having thus described my invention, I claim:—

1. A lens for spectacles or eyeglasses, provided with a convex surface having a spherical curvature, and a concave surface having a parabolic curvature.

2. A lens for spectacles or eyeglasses, provided with a convex surface having a spherical curvature, and a concave surface having a parabolic curvature, the two surfaces being so related to each other as to cause a constant variation in the focal length of the lens as the line of vision passes from one edge to the other.

3. A spectacle lens provided with a convex ground surface having a spherical curvature, and a concave molded surface having a parabolic curvature, the latter surface being so related to the former as to cause a gradual variation of the focal length of the lens as the line of vision passes from the upper edge to the lower edge.

In testimony whereof, I have hereunto signed my name, at Philadelphia, Pennsylvania, this twenty-seventh day of January 1909.

HENRY ORFORD.

Witnesses:
 JAMES H. BELL,
 E. L. FULLERTON.